Patented Jan. 12, 1932

1,840,597

UNITED STATES PATENT OFFICE

WILLIAM HENRY MOSS AND BLANCHE BABETTE WHITE, OF CUMBERLAND, MARYLAND, ASSIGNORS TO CELANESE CORPORATION OF AMERICA, A CORPORATION OF DELAWARE

SYNTHETIC RESIN AND PROCESS OF MAKING THE SAME

No Drawing.   Application filed November 17, 1928.   Serial No. 320,211.

This invention relates to the preparation of a synthetic resin from toluene sulfonamid, and also to coating or plastic compositions containing derivatives of cellulose, and particularly organic derivatives of cellulose.

An object of our invention is to prepare a synthetic resin that is compatible with derivatives of cellulose, and therefore suitable for use in the films, lacquers or other coating compositions or plastics containing such derivatives of cellulose.

A further obect of our invention is to provide a suitable resin for lacquers or plastic compositions containing organic substitution products of cellulose such as cellulose acetate, which resin is compatible with the other constituents of the lacquers and which produces clear solutions which, upon drying, form films that are adherent, tough, hard and water repellant.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

We have found that the synthetic resins produced from aromatic sulfonamid, such as toluene sulfonamid and benzaldehyde are compatible with cellulose acetate, and that when added to lacquers containing cellulose acetate they form clear solutions that, upon drying, produce clear, hard, tough and firmly adherent films.

The selection of a suitable resin for a lacquer containing the organic derivatives of cellulose presents a difficult problem because the resin must be compatible with the organic derivatives such as cellulose acetate, both in solution and in the dry films and also with softeners, pigments, dyes which may be added to produce desired effects and variations of the films. In general, a synthetic resin for this purpose should be easily prepared from preferably cheap materials, it should be free of or easily freed from any catalysts, either acid or alkaline, used in its preparation, it should of itself be practically neutral and should be strongly resistant to water and free from water soluble materials.

We have found that the special resins prepared from toluene sulfonamid and benzaldehyde in the absence of a catalyst or in the presence of either acid or alkaline catalysts can be used as above stated in cellulose derivative lacquers or plastic compositions.

In accordance with our invention, we prepare a synthetic resin formed by the condensation of an aromatic sulfonamid such as toluene sulfonamid, benzene sulfonamid, or xylene sulfonamid, and benzaldehyde. This synthetic resin is then used for making a lacquer or a plastic composition which contains one or more derivatives of cellulose and a volatile solvent. The lacquer may also contain one or more natural or semi-synthetic resins or gums, one or more plastifiers or softening agents, medium and/or high boiling point solvent and preferably but not necessarily some pigments and/or dyes.

The solutions thus formed may be employed as lacquer or coating compositions for metal, glass or other surfaces and may be used for making photographic or other films.

Artificial yarns may be formed by extruding the solutions containing the special resin and a derivative of cellulose through the orifices of a spinnerette, either into a heated evaporative atmosphere as in dry spinning, or into a precipitating bath, as in wet spinning. The solution may also be employed as an adhesive, and is particularly useful in this connection for making shatterless glass by causing celluloid sheets to adhere to surfaces of sheets of glass between which they are placed.

The plastic containing derivatives of cellulose and our resin, may be worked into sheets which may also be used for laminated glass, and also may be worked into blocks or articles in any known manner.

The derivatives of cellulose that may be used for making solutions, coating or plastic compositions, comprises any suitable derivative, such as cellulose nitrate or organic derivatives of cellulose. Examples of organic derivatives of cellulose are: organic esters of cellulose, such as cellulose acetate, cellulose formate, cellulose propionate, or cellulose butyrate and cellulose ethers, such as ethyl cellulose, methyl cellulose, or benzyl cellulose.

The low boiling point solvent that may be employed may be one or a mixture of two or more of the following: acetone, alcohol, benzene or ethylene dichloride. Examples of medium and/or high boiling solvents are: ethyl acetate, ethyl lactate, tetrachlorethane, benzyl alcohol or diacetone alcohol. Examples of suitable plasticizers are: diphenylol propane, monomethyl xylene sulfonamid, ortho or meta ethyl toluene sulfonamid. If desired, fire retardants may be added, particularly the very effective bromine derivatives of organic compounds, such as brominated tricresyl phosphate.

The pigments or dyes that may be used are any of the ordinary pigments or dyes used in the paint or lacquer industry.

Of the natural gums or resins that may be employed, the following may be mentioned: manila, accroides, pontianak, kauri, dammar, rosin and shellac.

The semi-synthetic resin ester gum, which is the glycerol ester of rosin, may also be added. Examples of other synthetic resins that may be used in conjunction with our resin, are the fusible and soluble phenol-formaldehyde, diphenylol propane-formaldehyde preferably prepared in the presence of acid catalysts, and phenol-furfural resins and toluene sulfonamid and formaldehyde resins.

The following is a detailed description of one mode of preparing our resin:

Equimolecular proportions of paratoluene sulfonamid and benzaldehyde are heated together under reflux for 8 hours at 150° C. A resin is obtained, which is washed with water to remove excess reactants, and is then freed from water by distillation or by drying in the air. Catalysts, neutral, acid or alkaline may be added as desired. The resin is soluble in acetone and alcohol, and largely insoluble in benzene. The toluene sulfonamid that is employed may be a pure product having a melting point of 137°, or it may be a commercial product having a lower melting point. The benzaldehyde may be a pure product or a commercial one. While equimolecular proportions are preferred, the proportions used may be varied considerably.

The resin formed by the above method has a melting point of from 50 to 60° C. It is completely compatible in all proportions with cellulose acetate in films, plastics, threads, lacquers, etc. It is to be understood that whilst other synthetic resins, as mentioned above, may be used with our resin, it is also permissible to prepare a complex resin at the same time. That is, for example, a mixture of formaldehyde and benzaldehyde, or of furfural and benzaldehyde may be condensed with the toluene sulfonamid, and other products such as urea, phenol, analine, acetone, etc., may be added to the reaction mixture together with a larger quantity of aldehyde so that a complex resin is produced. The resin thus produced is suitable for mixture with cellulose acetate and cellulose derivatives to produce films, plastics, threads, lacquers, etc.

Owing to the complete compatibility with cellulose acetate the resin is particularly suitable for admixture with it in any of the numerous technical applications of this ester. It may be used in small proportions to make films which have greater tensile strength than films from the cellulose ester alone. Such films are suitable for protective coatings on cloth, fabric, wire, leather, etc., and may be added to cellulose esters in the production therefrom of filaments, and threads, as in the manufacture of artificial silk. In larger proportions, it is especially useful in cellulose acetate lacquers, plastics, and in solutions for use as adhesive.

It is to be understood that the foregoing detailed description is given merely by way of illustration, and that many variations may be made therein without departing from the spirit of our invention.

Having thus described our invention, what we desire to claim and secure by Letters Patent is:

1. Method of preparing a synthetic resin comprising reacting an aromatic sulfonamid with benzaldehyde.

2. Method of preparing a synthetic resin comprising reacting toluene sulfonamid with benzaldehyde.

3. Method of preparing a synthetic resin comprising heating an aromatic sulfonamid with benzaldehyde for about 8 hours.

4. Method of preparing a synthetic resin comprising heating toluene sulfonamid with benzaldehyde for about 8 hours.

5. A synthetic resin prepared by reacting an aromatic sulfonamid with benzaldehyde.

6. A synthetic resin prepared by reacting toluene sulfonamid with benzaldehyde.

7. A synthetic resin prepared by reacting an aromatic sulfonamid with benzaldehyde, said resin having a melting point of between about 50° to 60° C.

8. A synthetic resin prepared by reacting toluene sulfonamid, said resin having a melting point of between about 50° to 60° C.

In testimony whereof, we have hereunto subscribed our names.

WILLIAM HENRY MOSS.
BLANCHE B. WHITE.